Figure 1:
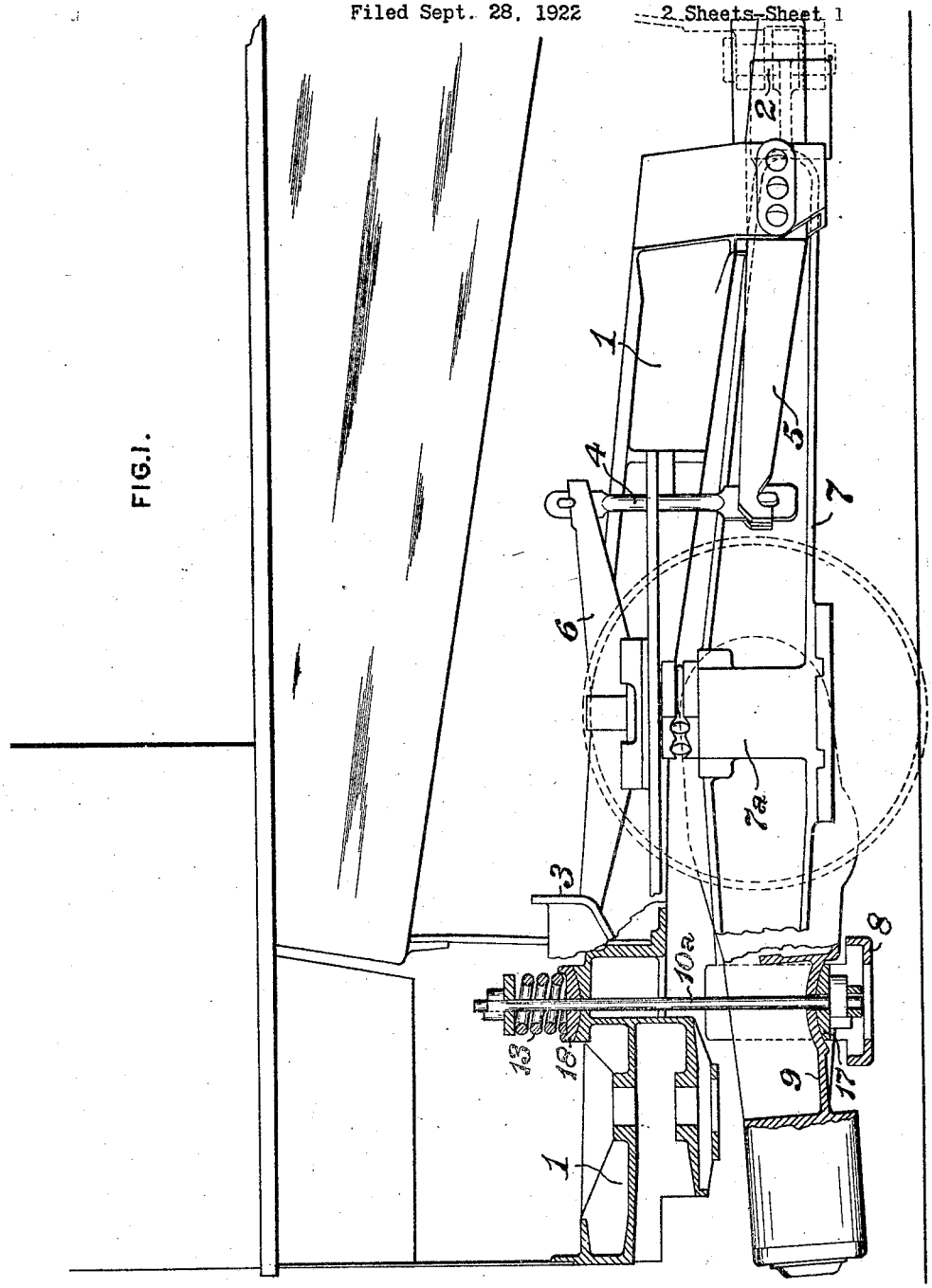

Nov. 2, 1926.

1,605,091

J. G. BLUNT

AUXILIARY ENGINE SUPPORT FOR LOCOMOTIVES

Filed Sept. 28, 1922  2 Sheets-Sheet 1

WITNESSES

S. H. Harrington
S. R. Bell

INVENTOR
James G. Blunt.

Nov. 2, 1926.  1,605,091
J. G. BLUNT
AUXILIARY ENGINE SUPPORT FOR LOCOMOTIVES
Filed Sept. 28, 1922   2 Sheets-Sheet 2
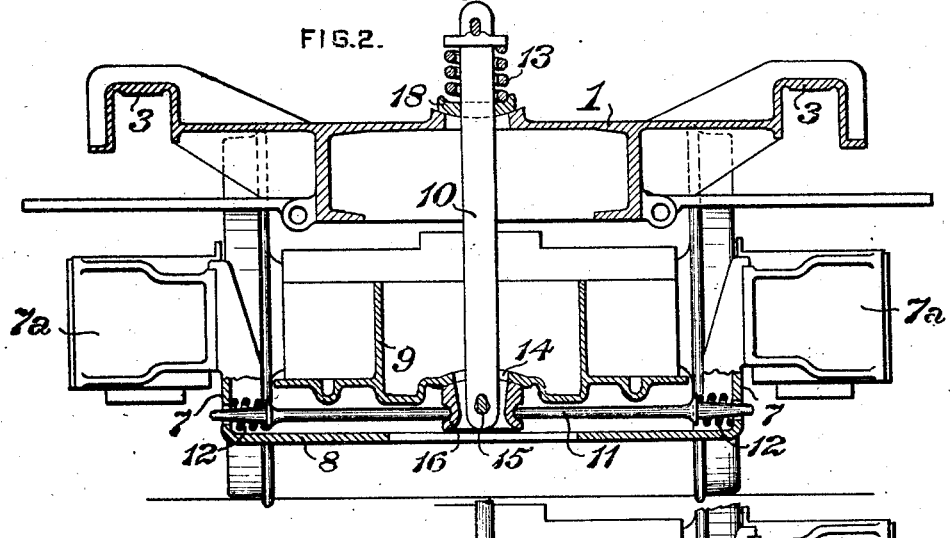
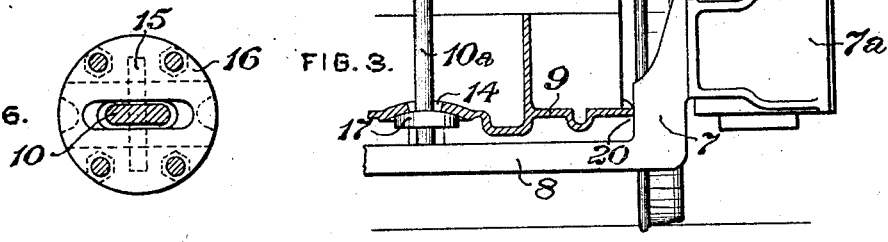
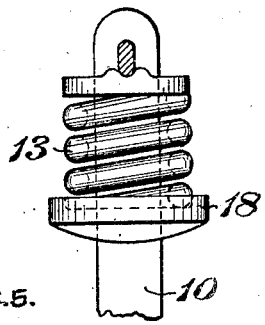
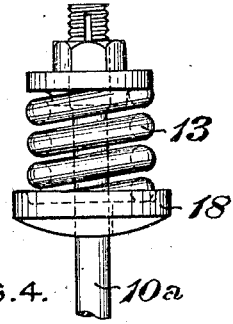
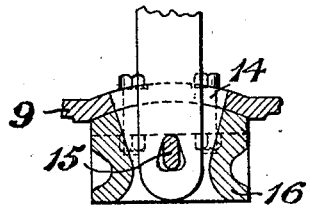
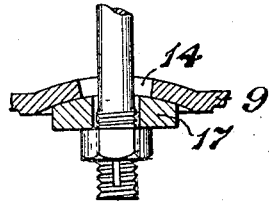
WITNESSES
INVENTOR
James G. Blunt, Patented Nov. 2, 1926.

1,605,091

UNITED STATES PATENT OFFICE.

JAMES G. BLUNT, OF SCHENECTADY, NEW YORK.

AUXILIARY-ENGINE SUPPORT FOR LOCOMOTIVES.

Application filed September 28, 1922. Serial No. 591,061.

My invention relates to means for supporting auxiliary or so-called "booster" engines, such as are applied on the trailing trucks of locomotives.

In order to increase the tractive power of locomotives, particularly for starting purposes, additional or auxiliary engines have, in some instances, been applied to the trailing trucks. This type of auxiliary engine, now known as a booster, is adapted to be hung upon the rear of the trailing truck frame behind the axle, and in the type of trailing truck having the journal boxes formed integral with or directly attached to the truck frame, the auxiliary engine thus located, becomes a dead weight, which requires the trailing truck frame to be considerably strengthened to sustain the shocks incident to its operation.

The principal object of my invention is to overcome this objection by the provision of means for supporting the auxiliary engine from some spring supported part of the locomotive, such as the main frame, and another object is to provide such a support as will allow the auxiliary engine to accommodate itself to all positions of the truck, with relation to the main structure of the locomotive, as in passing over uneven or curved portions of track, and also to maintain the proper lateral alignment of the rear end of the auxiliary engine with its front end.

The improvement claimed is hereinafter fully set forth.

In the accompanying drawings: Figure 1 is a side view, in elevation, of the rear end of a locomotive having a trailing truck, with its frame and journal boxes formed integral, and showing, partly in section, one form of auxiliary engine suspension means embodying my invention; Fig. 2, a transverse section through the trailing truck, but showing a structural modification in which the suspension hanger for the auxiliary engine is in the form of a flat bar; Fig. 3, a partial transverse section of the construction shown in Fig. 1; Fig. 4, a detail view of the round bar type of suspension hanger; Fig. 5, a detail view of the flat bar type of hanger; and, Fig. 6, a horizontal section of the flat bar construction shown in Fig. 5.

My invention is particularly adapted to be employed in connection with a type of trailing truck in which the axle journal boxes are formed integral with, or directly attached to, the truck frame, and in the drawings, I have illustrated a trailing truck of this type having side frame members, 7, pivoted at their forward ends to the swivel pin connection, 2, on the main frame, 1, journal boxes, 7ª, and a transverse or cross member, 8, connecting the rear ends of the members, 7. The trailing truck springs, 6, which are mounted at the tops of the journal boxes, have their rear ends bearing in the member, 3, of the main frame, 1, while the forward ends of the springs are connected by the usual hangers, 4, and equalizers, 5, with the rest of the spring rigging system, in the ordinary way.

In the usual practice, the frame, 9, of the auxiliary engine, is mounted, at its front end, on journals surrounding the trailing truck axle, but the main support for the engine is located farther back, and in accordance with my improvement, this main support is carried by some spring supported member, such as the main frame of the locomotive. Various forms of suspension means may be designed for this purpose, within the scope of my invention, but I have illustrated one form of suspension, comprising a hanger bar, located at substantially the longitudinal centre line of the locomotive and of the auxiliary engine frame, and having a universal or swinging connection at the bottom with the auxiliary engine frame, 9, and at the top, with the main frame, 1, of the locomotive.

The hanger bar may be either of the round bar type, 10ª, as shown in Figs. 1, 3 and 4, or of the flat bar type, 10, as shown in Figs. 2, 5 and 6. In either case, the upper end of the bar is supported by a cushion spring, 13, bearing upon a spherical faced washer, 18, seated upon the main frame, 1. When the flat bar hanger, 10, is employed, the lower connection, 16, may be bolted to, the auxiliary engine frame, 9, while the bar, 10, is attached to the fitting, 16, by means of a horizontal pin, 15, the opening, 14, being flared to provide for the swinging action of the hanger, as shown in Figs. 5 and 6. The fitting, 16, may also be provided with sockets for seating the ends of the thrust rods, 11, 11, which are provided, at their outer ends, with cushion springs, 12, 12, bearing against the side members of the truck frame, for absorbing shocks and for centralizing the rear end of the auxiliary engine.

When the round bar hanger, 10ª, is employed, the lower connection may be supported by a spherical faced washer, 17, having a corresponding concave seat in the frame, 9, as shown in Figs. 1, 3 and 4. The centralizing function may also be obtained by so constructing the cross member, 8, of the truck frame, that guiding faces are formed to bear against the edges of the auxiliary engine frame, as indicated at 20, in Fig. 3.

In operation, any lateral movement of the truck frame will cause the spherical faced washers to shift in their seats and allow the hanger to assume the necessary deflection, and thereby provide an adjustable spring support for the auxiliary engine.

I claim as my invention and desire to secure by Letters Patent:

1. In a locomotive, the combination, with a main frame, and a trailing truck having a frame formed rigid with the journal boxes, of an auxiliary engine for the trailing truck; a hanger device for supporting said auxiliary engine from the main frame; and means for laterally centralizing the auxiliary engine, relatively to the trailing truck frame.

2. In a locomotive, the combination, with a main frame, and a trailing truck having a frame formed rigid with the journal boxes, of an auxiliary engine for the trailing truck; a centrally located laterally swinging hanger for supporting said auxiliary engine from the main frame; and spring actuated thrust rods for centralizing the auxiliary engine relative to the truck frame.

JAMES G. BLUNT.